Jan. 4, 1966
L. ZIMMERMANN
3,227,013
TREPANNING TOOLS
Filed Oct. 24, 1963
3 Sheets-Sheet 1
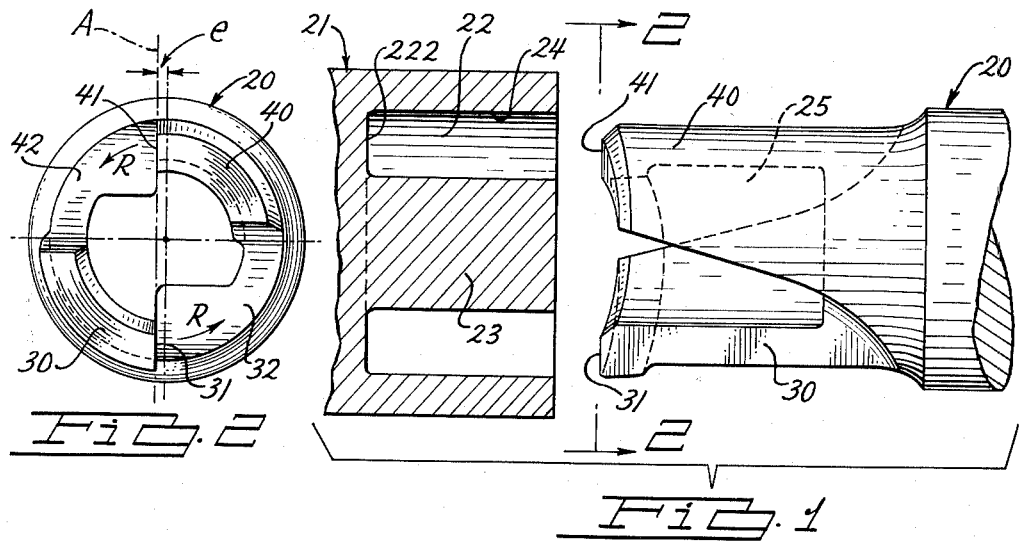
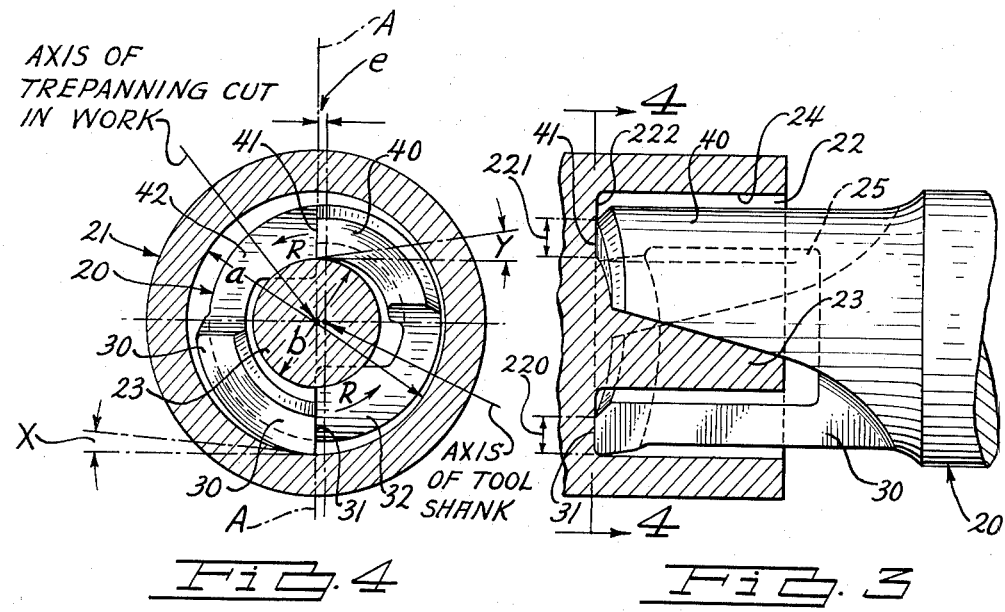
INVENTOR.
LUKAS ZIMMERMANN
BY
Everett G. Wright,
ATTORNEY Jan. 4, 1966     L. ZIMMERMANN     3,227,013
TREPANNING TOOLS
Filed Oct. 24, 1963     3 Sheets-Sheet 2

INVENTOR.
LUKAS ZIMMERMANN
BY
Everett G. Wright
ATTORNEY

Jan. 4, 1966  L. ZIMMERMANN  3,227,013
TREPANNING TOOLS

Filed Oct. 24, 1963  3 Sheets-Sheet 3

INVENTOR.
LUKAS ZIMMERMANN
BY
Everett E. Wright
ATTORNEY

United States Patent Office 3,227,013
Patented Jan. 4, 1966

3,227,013
TREPANNING TOOLS
Lukas Zimmermann, 5755 Bloomfield Glens Road,
Birmingham, Mich.
Filed Oct. 24, 1963, Ser. No. 318,622
2 Claims. (Cl. 77—69)

This invention relates to cutting tools and in particular to trepanning tools.

For the purpose of this application, trepanning is best defined as a cutting operation which produces in a finished work piece an annular recess providing a cylindrical boss located concentrically within a cylinder bore.

The primary object of this invention is to provide an improved trepanning tool which will consistently and accurately produce the two diameters of a trepanning cut unaffected by repeated resharpening and without requiring any adjustment of the machine tool slide after removal of the trepanning tool from the tool holder, resharpening of the trepanning tool, and replacing the tool in the tool holder.

Another object of the invention is to provide a trepanning tool which is at the same time a form tool, meaning that, simultaneously with producing the trepanning cut, it will consistently and accurately produce any simple or complicated cross sectional shape at the bottom of the trepanned cut for which it has been designed, unaffected by repeated resharpening.

Another object of the invention is to provide an extremely efficient and economical tool for performing trepanning operations that effectively handles the chips from deep trepanning cuts and which is readily sharpened by simple conventional tool sharpening procedures.

Other objects of the invention will become apparent by reference to the following detailed description taken in connection with the accompanying drawings, in which:

FIG. 1 is an exploded view showing a trepanned work piece with a trepanning tool embodying the invention removed therefrom.

FIG. 2 is an end view taken on the line 2—2 of FIG. 1 showing the geometric relationship of the cutting faces of the trepanning tool to the axis of the tool shank.

FIG. 3 is a longitudinal sectional view of a work piece with the trepanning tool embodying the invention positioned in cutting relationship therewithin.

FIG. 4 is a cross sectional view taken on the line 4—4 of FIG. 3 showing the trepanning tool in end elevation and the relationship of the cutting faces thereof to the work piece.

Figure 6:
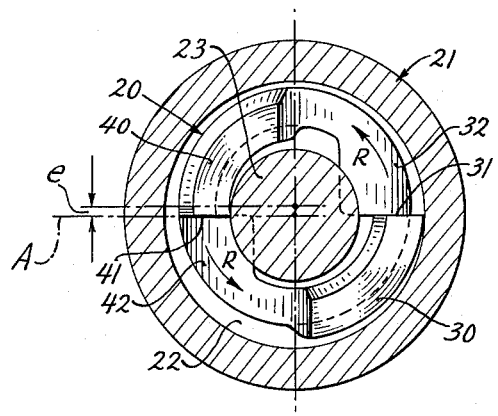
FIG. 6 is a cross sectional view taken on the line 6—6 of FIG. 5.
Figure 5:
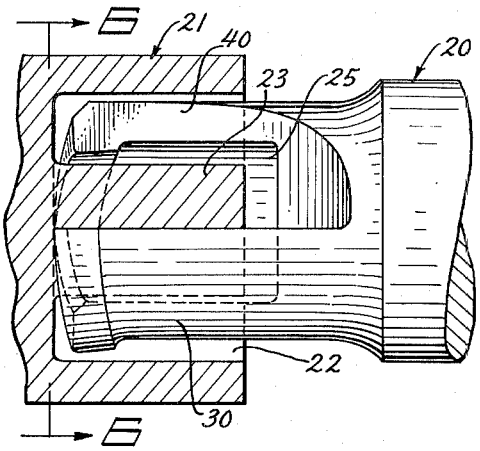
FIG. 5 is a longitudinal sectional view of a work piece similar to FIG. 3 with the improved trepanning tool positioned in cutting relationship therewithin, but with the trepanning tool turned 90 degrees from its position shown in FIG. 3.

Referring now to the drawings, and in particular to FIGS. 1–6 inclusive, an illustrative embodiment of a trepanning tool 20 is disclosed which makes a trepanned cut in a work piece 21, the said cut providing an annular recess 22 between a cylindrical boss 23 centrally disposed in a cylindrical bore 24 and the wall of said cylindrical bore 24.

To accomplish the trepanned cut, the work piece 21 may be rotatably held while the trepanning tool 20 is fixedly mounted in axial offset relationship with respect to the center of the trepanned cut. Of course, alternatively, the trepanning tool may be rotated about the axis of the trepanning cut in the work piece 21 while the work piece remains fixed. In either instance, a proper axial feed of the trepanning tool into the work is required. The trepanning operation may be accomplished on a lathe or other machine tool incorporating means for holding the work, means for holding the trepanning tool, means for rotating the work with respect to the trepanning tool, or vice versa, while advancing the tool axially toward and into the work, and means mounting the axis of the trepanning tool in offset relationship to the axis of the trepanning cut.

As shown throughout FIGS. 1–6 inclusive, the cutting end of the trepanning tool 20 is axially hollow at 25 and is bifurcated forming two arcuate cutting arms or elements 30 and 40 having cutting teeth 31 and 41 respectively.

It will be observed that the cutting tooth 31 is shaped to perform as a boring tool, and, as the trepanning tool 20 is fed axially into the work 21, the cutting tooth 31 will bore the diameter "a" of the cylindrical bore 24 forming the outer annular portion 220 of the annular recess 22 as indicated in FIG. 3. Simultaneously the cutting tooth 41, which is shaped to perform as a turning tool, turns the diameter "b" of the cylindrical central boss 23 forming the inner annular portion 221 of the annular recess 22 as indicated in FIG. 3. In other words, the said cutting teeth 31 and 41 combine to cut the annular recess 22 and finish the annular bottom 222 thereof, each cutting tooth 31 and 41 cutting the outer and inner annular portion of the recess 22 in simultaneous progression from the top to the bottom of the said recess 22. It is essential either that each of the cutting teeth 31 and 41 are over fifty percent of the width of the annular bottom of the trepanned cut or are of a combined width greater than the annular bottom 222 of the recess 22.

During the aforedescribed cutting operation, the material removed from work piece 21 to form the annular recess 22 is divided into two parts or chip ribbons, the cutting tooth 31 removing an outer chip ribbon which leaves the tool through the chip slot 32, and the cutting tooth 41 removing an inner chip ribbon which leaves the tool through the chip slot 42. Although the chips from the two cutting teeth 31 and 41 have been described as chip ribbons, in practice these so-called ribbons easily break up, and, because they are of less width than the annulus of the annular recess 22, they readily leave the trepanning tool through the chip slots 32 and 42 and at the same time provide abundant room for cutting fluid to enter and leave the annular recess 22 as it is being formed. The chip slots 32 and 42 respectively constitute the space between the cutting arms 30 and 40 rotationally ahead of the face of the cutting teeth 31 and 41, see FIG. 4.

By reference to FIGS. 3–6 inclusive it will be observed that the cutting teeth 31 and 41 are preferably shaped along circular helical curves to provide the necessary end clearance between the tool 20 and the cut surfaces of the work piece 21. In other words, each cutting tooth 31 and 41 is generated to the desired cross sectional shape advancing along a helical curve by a combined rotary and translatory motion, the rotation having as its center the axis of the tool shank, and the direction of the translatory motion being parallel with the axis of the tool shank, the ratio of translatory motion to rotary motion being of a value which will provide the desired end clearance. During this combined motion each point of the cross sectional outline describes a true helix, which can also be pictured as a helical curve scribed upon an imaginary cylinder, whose end projection is a true circle with a radius equal to the distance of the point from the axis of the tool.

In order to maintain the axial or longitudinal relationship of the two end cutting edges to each other throughout the life of the trepanning tool, it is essential that the helical relief of the two cutting teeth be of precisely the same magnitude.

By reference to FIGS. 2 and 4 it will be observed that the cutting faces 31 and 41 of the cutting teeth are located in a common plane A—A, which is located at a small distance "$e$" from the tool axis in such a way that a plane passing through the tool axis parallel to the aforementioned plane will miss the outer tooth 31 which functions as a boring tool, by the distance "$e$," while it passes through the inner tooth 41, which functions as a turning tool at a distance "$e$" below the cutting face of the tooth.

In operation, the tool is positioned in relation to the work in such a way that the two cutting faces are in one common plane passing through the axis of the work piece. This brings the axis of the tool shank parallel to, but by a distance "$e$" removed from the axis of the work. From FIG. 4 it can be seen that in this position the tool will contact the work only along the cutting edges, while the tool surfaces curve away from the work surfaces, thus providing radial cutting clearance angles "X" and "Y." The distance "$e$" must be chosen to bring both of these clearance angles within practical limits. In FIG. 4, $\tan X = e/\frac{1}{2}a$ and $\tan Y = e/\frac{1}{2}b$. Since the trepanning tool derives its radial cutting clearance from its offset positioning relative to the axis of the trepanning cut, it is important that this geometric relationship be maintained throughout the cutting operation.

Whenever the trepanning operation is performed by rotating the work piece while the tool remains stationary, it is obvious that this offset geometric relationship is maintained. However, if the trepanning operation is performed by rotating the tool while the work piece remains stationary, it must be noted that the tool must not be rotated about its own axis. Instead, it must be rotated about the axis of the trepanning cut in the work piece. This requires that the tool shank be mounted in the machine spindle in an offset position at a distance "$e$" from the spindle axis, the direction of this offset being at 90 degrees to the common plane of the two cutting faces and away from the cutting face which functions as a boring tool.

Figure 9:
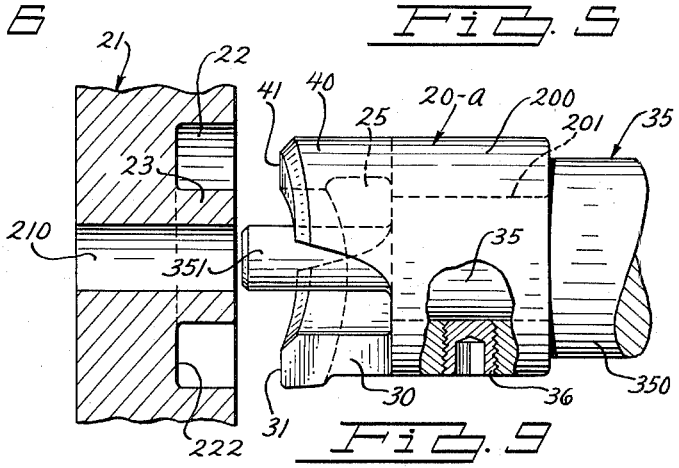
FIG. 9 is a view taken on the line 9—9 of FIG. 7.
Figure 8:
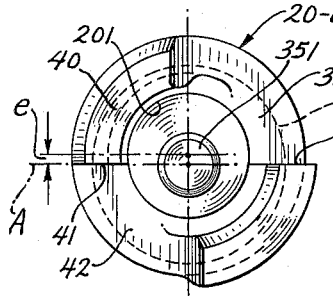
FIG. 8 is an end view taken on the line 8—8 of FIG. 7.
Figure 7:
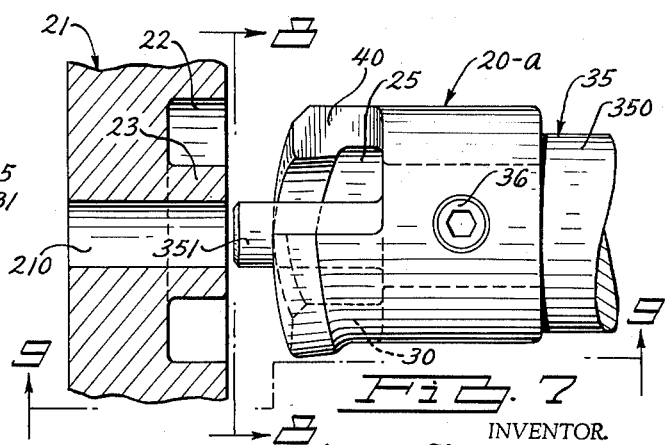
FIG. 7 shows a trepanning tool held on an eccentric arbor, the work piece being stationary.

The proper mounting of the trepanning tool in a machine spindle may be accomplished by various means, such as by the use of an offset boring head on an eccentric bushing, not shown. Still another method is shown in FIGS. 7–9 inclusive. Here the shank 290 of the trepanning tool 20–a, which is like the trepanning tool 20 of FIG. 1–6 inclusive except that it is made hollow at 201, and the tool 20–a is held on an eccentric arbor 35. The shank 350 of the eccentric arbor 35 can then be held concentric in the machine tool spindle. As shown in FIGS. 7–9 inclusive, the arbor 35 may incorporate a pilot 351 concentric with the shank 350 for guiding the trepanning tool 20–a when a trepanning cut 22 is made concentrically around an existing hole 210 in workpiece 21. A notch or mark (not shown) may be machined into the arbor 35 to facilitate locating the face of the cutting tooth 31 of the tool 20–a in proper relationship to the direction of the offset or eccentric after each resharpening of the said tool. The trepanning tool 20–a may be fixed to the arbor 35 (or spindle) by such means as a set screw 36 or otherwise.

Figure 11:
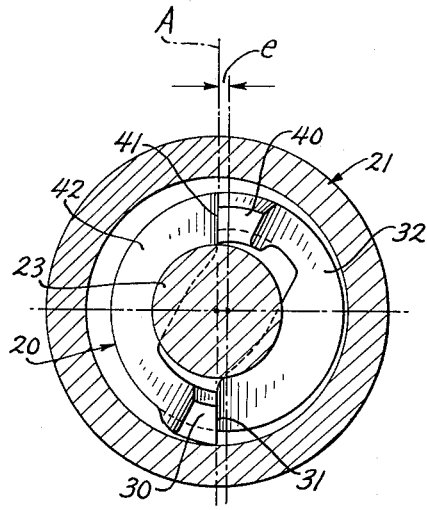
FIG. 11 shows the resharpened tool rotated into the proper cutting position.
Figure 10:
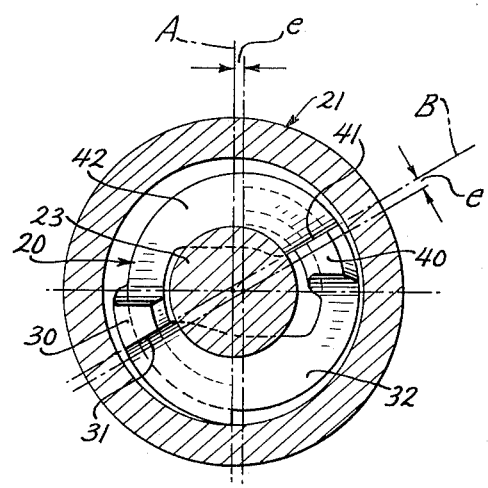
FIG. 10 is an end view showing a trepanning tool after repeated resharpening and repositioned in its tool holder.

To sharpen a trepanning tool 20, it is ground at the cutting faces of the two cutting teeth in a manner similar to that employed in sharpening conventional circular form tools. It is important that the resharping be done in such a way that the geometric relationship of the cutting faces to the axis of the tool shank be accurately maintained, i.e. after resharpening, both cutting faces must be in a common plane located a distance "$e$" from the axis of the tool shank. When the resharpened tool is replaced in its holder in the machine as indicated in FIG. 10, it must be rotated to bring the newly sharpened tool faces into the same position as were the original faces before resharpening, see FIG. 11. Since the end projections of the outer and inner tool edges are circular and concentric with the axis of the tool shank, it is obvious that the newly sharpened cutting edges will be located in identically the same position relative to the work piece as were the original cutting edges, and consequently the newly resharpened tool will produce work pieces having the same diameters without the necessity of machine adjustments such as transverse slide adjustment. Accordingly, trepanning tools of the invention are readily employed on drill presses as well as on lathes and other machine tools.

The tool can be sharpened repeatedly, taking away additional tool stock up to the plane B—B as indicated in FIG. 10, leaving only sufficient stock in each cutting arm or element 30 and 40 to provide adequate strength for the trepanning tool to perform its function without breakage. This assures an extremely long tool life.

Figure 12:
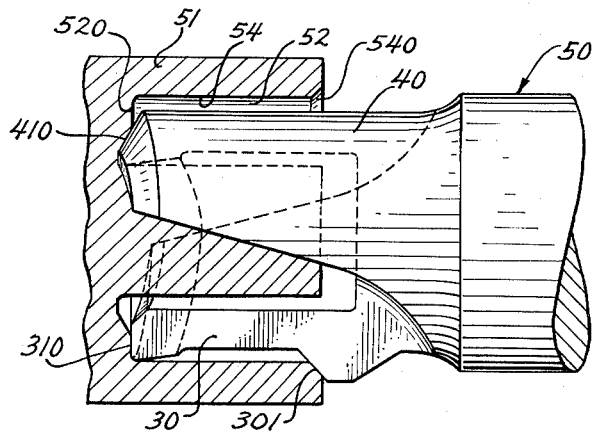
FIG. 12 is a longitudinal sectional view similar to FIG. 3 showing how a trepanning tool of the type shown in FIGS. 1–8 inclusive can be formed to provide, for example, a shaped rather than a flat bottom to a trepanned cut, and a chamfer at the outer edge of the cylindrical wall of the trepanned cut, all while performing the trepanning operation.

Referring now to FIG. 12, it will be observed that, by suitably shaping the axial end of the cutting teeth 310 and 410 of the trepanning tool 50 disclosed therein, and/or by suitably forming the cutting arm 30 of the said trepanning tool 50 at 301, the annular bottom 520 of the annular recess 52 of the work piece 51 and the outer edge 540 of the wall of the cylindrical bore 54 of the said work piece 51 may be shaped and/or chamfered respectively. Otherwise, the trepanning tool 50 is like and similar to the illustrative embodiment of the invention disclosed in FIGS. 1–11 inclusive.

It is obvious that many changes may be made in the size, shape and arrangement of the various elements of a trepanning tool embodying the invention, all without departing from the spirit and scope of the invention as defined by the appended claims.

I claim:

1. A cutting tool for performing trepanning cuts in a work piece comprising a shank and an axially bifurcated head providing a pair of cutting elements, said cutting elements being formed on circular helical curves concentric with the axis of the shank, each cutting element having a cutting tooth with the face thereof disposed in the direction of cutting rotation of said cutting tool, one cutting element being formed to cut the outer portion of the trepanning cut, the other cutting element being formed to cut the inner portion of the trepanning cut, and the axial ends of said cutting element being formed to cut the bottom of the said trepanning cut, the cutting edges of both teeth being located in a common plane parallel to the axis of the tool shank but spaced therefrom a distance sufficient to provide radial cutting clearance for both said cutting elements in respect to the work piece.

2. A cutting tool for performing trepanning cuts in a work piece comprising a shank and an axially bifurcated head providing a pair of cutting elements, said cutting elements being formed on circular helical curves concentric with the axis of the shank, each cutting element having a cutting tooth with the face thereof disposed in the direction of cutting rotation of said cutting tool,
one cutting element being formed to cut the outer portion of the trepanning cut, the other cutting element being formed to cut the inner portion of the trepanning cut, and the axial ends of said cutting element being formed to cut the bottom of the said trepanning cut,
the cutting edges of both cutting teeth being located in a common plane parallel to the axis of the tool shank, said tool shank axis being offset from said common plane, the direction of said offset being at 90 degrees to said common plane and away from the face of the cutting element which cuts the outer portion of the trepanning cut, the said offset being sufficient to provide radial cutting clearance for both said cutting elements in respect to the work piece.

References Cited by the Examiner

UNITED STATES PATENTS 3,086,410    4/1963    Zimmerman _____ 77—69

WILLIAM W. DYER, Jr., *Primary Examiner.*

F. S. HUSAR, *Assistant Examiner.*